United States Patent [19]

Anderson et al.

[11] B 4,076,698

[45] Feb. 28, 1978

[54] HYDROCARBON INTERPOLYMER COMPOSITIONS

[75] Inventors: Arthur William Anderson, Wilmington; Gelu Stoeff Stamatoff, Newark, both of Del.

[73] Assignee: E. I. Du Pont de Nemours and Company, Wilmington, Del.

[21] Appl. No.: 632,416

[22] Filed: Jan. 4, 1957

[44] Published under the second Trial Voluntary Protest Program on March 9, 1976 as document No. B 632,416.

Related U.S. Application Data

[63] Continuation-in-part of Ser. No. 568,707, March 1, 1956, abandoned.

[51] Int. Cl.$^2$ .................... C08F 210/14; C08F 210/16
[52] U.S. Cl. ............................ 526/348.6; 260/80.78; 260/88.2 B; 260/88.2 R
[58] Field of Search ................. 260/94.9, 88.1, 88.2 F, 260/88.2 R, 88.2 B, 80.78

[56] References Cited

U.S. PATENT DOCUMENTS

| | | | |
|---|---|---|---|
| 2,200,429 | 5/1940 | Perrin et al. | 260/88.1 |
| 2,396,785 | 3/1946 | Hanford | 260/94.9 |
| 2,691,647 | 10/1954 | Field et al. | 260/88.1 |
| 2,726,231 | 12/1955 | Field et al. | 260/88.1 |
| 2,731,452 | 1/1956 | Field et al. | 260/88.1 |
| 2,832,759 | 4/1958 | Nowlin et al. | 260/94.9 |
| 2,839,515 | 6/1958 | Davison et al. | 260/88.1 |
| 2,839,518 | 6/1958 | Brebner | 260/94.9 |
| 2,862,917 | 12/1958 | Anderson et al. | 260/94.9 |
| 2,905,645 | 9/1959 | Anderson et al. | 252/429 |

FOREIGN PATENT DOCUMENTS

| | | | |
|---|---|---|---|
| 538,782 | 12/1955 | Belgium | 260/94.9 |
| 526,101 | 5/1955 | Italy | 260/94.9 |

*Primary Examiner*—Alan Holler
*Attorney, Agent, or Firm*—Roger A. Hines

[57] ABSTRACT

Interpolymers composed of ethylene and higher olefinic hydrocarbons having 5 to 18 carbon atoms per molecule. Said interpolymers being useful as molding, pipes and wire coatings.

15 Claims, No Drawings

HYDROCARBON INTERPOLYMER COMPOSITIONS

This application is a continuation-in-part of Ser. No. 568,707, filed Mar. 1, 1956, now abandoned.

This invention relates to the production of hydrocarbon polymers, especially those having a long chain of carbon atoms with side chain substitution.

For many years the only polyethylene resin which was known contained numerous side chains substituted along the main polyethylene chain. During the 1940's methods were first discovered for producing linear polyethylene resin, which was virtually free of side chain substitution. This material when in the solid state was stiffer, more crystalline, and was of higher density, than the previously known polyethylene. Newer methods of preparation have recently made linear polyethylene (which is highly crystalline) quite attractive from an economic standpoint, although for many particular uses, where stiffness is undesirable, linear polyethylene is not as effective as the highly branched variety which was known earlier. The latter material was more pliable, and was suitable for use in squeeze bottles and other like articles; in contrast with this, the linear polyethylene, because of its desirable properties has a field of utility which, to some extent, is different from that of the older commercial polyethylenes. Thus, each variety of polyethylene had its own particular practical applications, and neither of these products could be used successfully in all of the applications for which the other variety was best suited, and there was no product which combined certain properties of the highly crystalline polymers (e.g. stiffness, abrasion resistance, etc.) with certain desirable properties of the branched polymers (e.g. high impact, toughness and stress crack resistance).

A question which has arisen is whether or not the previously known branched polyethylenes of commerce had the optimum structure for the particular applications for which they had been best suited. In this connection, it was noteworthy that the branched polyethylenes of commerce were of somewhat fortuitous structure, i.e. there was relatively little control over the length of the individual side chains, or their distribution along the main polymer chain, or the precise number of these side chains. Moreover, the prior art products which exhibited excellent stress crack resistance and excellent impact toughness were deficient in properties which are associated with increased crystallinity, namely hardness, stiffness, creep-resistance, etc. Indeed, the prior art tended to suggest that in the previously known adventitiously branched polyethylenes, reduction in the number of branched chains resulted in higher crystallinity and impairment of the stress crack resistance and a lowering of impact toughness. Thus it was not at all apparent that these problems could be solved by controlling the amount and nature of the side chains, through copolymerization with specific amounts of specific alkenes.

The discovery of highly active catalysts for polymerizing alpha olefins (Anderson et al, Ser. No. 450,243, filed Aug. 16, 1954, now U.S. Pat. No. 2,905,645; Ziegler, Belgian Pat. No. 533,362) to polymers which were linear with respect to the carbon atoms separated by the double bonds, provided a new tool whereby the effect of the size, number, and distribution of the side chains could be explored.

The exploration was undertaken, and, in accord with the present invention, it has given rise to the discovery of extraordinary effects not previously thought to be possible. For example, by controlling the length and number of the side chains at certain optimum levels, it was found to be possible to increase the tear strength of the polymer, as hereinafter further disclosed, and ultimate tensile strength by a factor of 240 percent. While retaining the resiliency of the older polyethylenes, these products have melting points which are higher, e.g. by 10° to 12°C. These important advantages are obtained without excessive loss of pliability or extrudability. In other words, the field of utility for the new polymers of this invention is about the same as for the earlier polyethylenes of branched structure, the difference being that the branching is controlled so as to produce results heretofore unobtainable in hydrocarbon polymers in these applications, e.g. in films, or other pliable, or relatively rigid, articles. Furthermore, it was also found, as a result of this exploration that by controlling the length and number of side chains at certain optimum levels, the following could be achieved:

a. A copolymer which can be extruded into film with excellent transparency, high stiffness, high melting point, and slow liquid and gas transmission rates and, surprisingly, with an impact toughness higher than any film forming polyethylene resin ever tested.

b. A copolymer which can be extruded into wire coatings which have a high melting point, high abrasion resistance, and high grease resistance, and which, surprisingly, have stress crack resistance at least equal to any other wire coating polyethylene resin ever tested.

c. A copolymer which can be extruded into pipe which has a high melting point and a low creep rate at elevated temperatures and which, surprisingly, has a longer time to failure when subjected to internal pressure both at room temperature and at elevated temperatures than does any other pipe forming polyethylene resin ever tested.

d. A copolymer which can be injection molded into various articles which have a high melting point, high stiffness, and high surface hardness and which, surprisingly, have good impact toughness and stress crack resistance at least equal to any injection moldable resin ever tested.

The advantages of the polymers of this invention are realized most fully when the polymerization is carried out at a high enough temperature to dissolve the polymer, but, of course, solution of the polymer is not always necessary. A suitable temperature which readily produces dissolved polymers (in liquid reaction media) is about 125° to 275°C., but temperatures as low as 20° or lower may be used. Pressure can be varied rather widely, but should be sufficient to aid in handling of reactants and reaction medium. The pressure is generally within the range of about 10 to 15000 pounds per square inch, a preferred range being about 200 to 2500 pounds per square inch. The polymerization catalysts employed are those of the coordination type by which is meant a catalyst composed of at least one compound of a transition element of Groups IVa, Va and VIa of the Periodic Table having halide and/or —O—hydrocarbon groups attached to said transition element, and a reducing component such as a metal hydride or compound having metal attached directly to carbon, e.g. a metal alkyl. Typical combinations are $TiCl_4$ + LiAl(alkyl)$_4$, VOCl$_3$ + Li(alkyl), MoCl$_5$ + Al(alkyl)$_3$, TiCl$_4$ + alkyl Mg Br, etc. All coordination catalysts are not equally effective in the practice of the present invention. In fact, the highly satisfactory catalysts all have halide attached to Ti in the transition element compound. Many of the most effective organometallic components are metal-alkyl compounds having aluminum as a metal component of the organometallic reducing agent. Uniquely effective as the organometallic component is LiAl (hydrocarbon)$_4$. An inert medium which is liquid under the polymerization conditions is employed. Suitable liquid media include cyclohexane, perchloroethylene, xylene, benzene, heptane, toluene, etc.

Among the alpha olefins, those which are most outstanding in imparting improved Elmendorf tear strength and other desirable properties, contain from 4 to 18, preferably 5 to 10, carbon atoms per molecule. Those which are most outstanding in producing resins with high impact strength and excellent stress crack resistance while at the same time being relatively high in crystallinity contain more than 4 carbon atoms and preferably 5 to 18 carbon atoms per molecule. Propylene is not effective; butene-1 shows only marginal effectiveness in this respect. Alpha olefins with a greater number of carbon atoms than 18 or so are not of commercial interest because of their high cost. Furthermore, the higher molecular weight alpha olefins produce branches which are sufficiently long to crystallize per se so that the branches behave in a manner similar to the backbone hydrocarbon structure of the molecule. Therefore, the higher molecular weight alpha olefins do not provide the desired combination of stress crack resistance, impact toughness and high crystallinity. To summarize, a plot of these desired properties versus number of carbon atoms in the alpha olefin molecule goes through a maximum.

In more specific embodiments, the invention is directed to ethylene-mono-alpha-olefin interpolymers, in which the latter component has a —CH=CH$_2$ group, and has from 5 to 10 carbon atoms, the content of the latter component being such as to produce an Elmendorf tear strength in the range of 150 grams/mil. to about 400 grams/mil. These interpolymers are characterized further by the fact that they are made by coordination polymerization. The X-ray crystallinity is generally about 40 to 70%, and the melt index is about 0.3 to 20.

Specific compositions wherein the comonomer has more than 4 carbon atoms per molecule exhibit tear strength of 150 to 300 grams/mil as measured by the Elmendorf tear test, at densities up to approximately 0.935; a stress crack resistance greater than 1000 hours as measured by the Western Electric wire twist test (described hereinafter), at densities up to approximately 0.945; a stress crack resistance of greater than 1000 hours as measured by the Bell Telephone Laboratories test using an unnotched test specimen and 100°C air as the active environment and at densities up to approximately 0.950; and a pipe endurance life of greater than 3000 hours at a hoop stress of 750 psi and temperature of 60°C. and densities up to approximately 0.935. These copolymers are characterized further by their ability to be fabricated by conventional fabricating techniques, i.e. they have melt indexes in the range of 0.2 to 20, their X-ray crystallinity is generally about 40 to 70%.

Certain film and substrate coating applications for polyethylenes require high stiffness, low liquid and vapor transmission rates and adequate impact toughness. Unfortunately, both the higher density conventional branched polyethylenes (densities greater than 0.920) and linear polyethylenes are too poor in impact toughness to qualify for these film and substrate coating applications. In fact, prior art for conventional branched polyethylenes of commerce teaches that impact toughness decreases with increasing crystallinity. In contrast with this, alpha olefin-ethylene copolymers of this invention containing a small weight percent of alpha olefin having more than 5 carbon atoms per molecule are unique among hydrocarbon polymers; they have, in addition to high crystallinity, impact toughness heretofore unobtainable in polyethylene resins. The copolymers based on butene-1 appear to be marginal in this respect.

In the case of n-heptene-1, the variation of impact toughness, as measured by the Elmendorf tear test, with proportion of the higher olefin in the copolymer is shown in table I.

TABLE I

EFFECT OF RATIO OF ETHYLENE:HEPTENE-1 ON INTERPOLYMER PROPERTIES (POLYMERIZATIONS CONDUCTED AT 180°C., 800 POUNDS PER SQ. IN. PRESSURE; CATALYST, 9.0 m. Al(ISOBUTYL)$_3$;6.5 m. (4.5 TiCl$_4$ to 1.5 VOCl$_3$); POLYMER ISOLATED BY METHANOL WASHING AND DRYING

| EXAMPLE NO. | % n-HEPTENE-1 IN FEED, BY WEIGHT | % n-HEPTENE-1 IN POLYMER (BY INFRA-RED) | MELT INDEX | DENSITY | X-RAY CRYST | STIFFNESS (psi) | ELMENDORF TEAR STRENGTH g./mil. |
|---|---|---|---|---|---|---|---|
| Control — | Conventional Branched Polyethylene | | 0.30 | .915 | 50% | 27,000 | 140 |
| | " | | .53 | .936 | 65% | 65,000 | 70 |
| 1 | 9.1 | 1.4 | 7.98 | .9489 | | | 35 |
| 2 | 16.7 | 2.1 | 1.84 | .9382 | 67% | 61,700 | 98 |
| 3 | 28 | 9.8 | .62 | .9154 | 49% | 26,900 | 353 |
| 4 | — | 7.7 | 6.56 | .9256 | | 37,900 | 157 |

The effect of varying chain length in the comonomer is shown in the following table, which records results obtained in polymerizations performed under conditions of catalyst, medium, temperature and pressure similar to those used in the tests reported in Table I. Thus the ethylene interpolymers of this invention having densities in the range of 0.910 to 0.935 and where the 1-olefin comonomer contains 5 to 18 carbon atoms have, in film form, Elmendorf tear strengths greater than 150 gm./mil. These ethylene interpolymers exhibit X-ray crystallinity of 40 to 70% and melt index values of 0.3 to 20.

TABLE II

EFFECT OF COMONOMER CHAIN LENGTH ON PROPERTIES
OF ETHYLENE INTERPOLYMERS (28%, BY WEIGHT OF COMONOMER IN FEED)

| EXAMPLE NO. | COMONOMER | DENSITY | %COMONOMER IN POLYMER | MELT INDEX | X-RAY CRYST | STIFFNESS (PSI) | ELMENDORF TEAR STRENGTH g./ml. |
|---|---|---|---|---|---|---|---|
| 5 | n-Butene-1 | .9282 | 5.6 | 2.15 | 50% | 25,500 | 124 |
| 5a | n-Butene-1 | .929 | 5 | .12 | 50% | 35,000 | 118 |
| 5b | n-Butene-1 | .927 | 5 | 1.0 | 49% | 32,000 | 133 |
|  |  | .936 | 4 | 0.5 | 60% | 60,000 | 70 |
| 5c | Propylene | .933 | 4 | 2.2 | 60% | 55,000 | 53 |
| 6 | n-Pentene-1 | .9031 | 14.5 | 12.9 | 39% | 12,300 | 172 |
| 7 | n-Pentene-1 | .9226 | 6.5 | 0.67 | 53% | 31,900 | 243 |
| 8 | n-Heptene-1 | .9154 | 9.8 | 0.62 | 49% | 26,900 | 353 |
| 9 | n-Decene-1 | .9258 | 5.0 | 0.60 | 56% | 37,000 | 312 |
| 9a | n-Decene-1 | .934 | 4 | 0.6 | 60% | 55,000 | 200 |
| 10 | n-Decene-1 | .9134 | 13.0 | 3.71 | 45% | 25,200 | 239 |
| 11 | n-Tetradecene-1 | .9300 | 5.6 | 0.57 |  | 32,900 | 199 |
| 11a | n-Tetradecene-1 | .9297 | 5.6 | 0.39 |  | 32,700 | 262 |
| 12 | 4-Methylpentene-1 | .9341 |  | 1.38 | 57% | 42,100 | 177 |

| EXAMPLE NO. | COMONOMER | TENSILE IMPACT STRENGTH (FT.LBS./IN$^2$) | TENSILE YIELD POINT (PSI) | TENSILE ULTIMATE STRENGTH (PSI) |
|---|---|---|---|---|
| 5 | n-Butene-1 |  |  |  |
| 5a | n-Butene-1 |  |  |  |
| 5b | n-Butene-1 |  |  |  |
| 5c | Propylene |  |  |  |
| 6 | n-Pentene-1 | 119 | 855 | 1590 |
| 7 | n-Pentene-1 | 210 | 1730 | 2650 |
| 8 | n-Heptene-1 | 549 | 1290 | 2810 |
| 9 | n-Decene-1 | 381 | 1880 | 4350 |
| 9a | n-Decene-1 |  |  |  |
| 10 | n-Decene-1 | 142 | 1270 | 2770 |
| 11 | n-Tetradecene-1 |  |  |  |
| 11a | n-Tetradecene-1 |  |  |  |
| 12 | 4-Methylpentene-1 | 132 | 2150 | 3480 |

The method of preparation of the interpolymers is illustrated further by the following additional examples.

EXAMPLE 13

Into a reaction vessel equipped with inlet and outlet means was pumped a mixture of cyclohexane (9 pounds per hour), aluminum tri-isobutyl solution in cyclohexane (0.5 pound per hour; concentration, 9.0 millimols per pound), TiCl$_4$+VOCl$_3$, in cyclohexane (0.5 pounds per hour; concentration 6.0 millimols of 4.95 TiCl$_4$:1.5 VOCl$_3$ per pound), ethylene (one pound per hour, and decene-1, 0.396 pound per hour. Temperature of the reaction mixture was maintained at 161°–163°C. and pressure at 800 pounds per square inch. The polymer was isolated by precipitation from solution with methanol. Rate of production was 409,000 pounds per pound mol of Ti + V in the catalyst. The product could be melt extruded into a monofilament which could be cold drawn. Standard dimension 1-inch pipe (Schedule 40) made of this product by extrusion withstood 3000 hours at a hoop stress of 750 psi at a temperature of 60°C.

EXAMPLE 14

A catalyst was prepared by mixing 20 grams TiCl$_4$ with a cyclohexane solution (400 ml. cyclohexane) of phenyl magnesium bromide (0.4 mol), followed by filtering the resulting product in a nitrogen atmosphere. The solid catalyst was stored under nitrogen. A portion of the catalyst (3 grams) was admixed with 100 ml. cyclohexane; 30 grams styrene was added, and the mixture was pressured to 500 psi with ethylene, at about 25°C. The resulting mixture was filtered, washed with methanol, HCl and dried at 70°C., yielding 5.5 grams of ethylene-styrene interpolymer. A film molded from this interpolymer had a density of 0.93. The interpolymer was soluble in decahydronaphthalene at 125°, and the inherent viscosity, measured at 0.1% concentration in that solvent at 125°C. was 8.0.

EXAMPLE 15

Into a mixture composed of 100 ml. o-dichlorobenzene, 4 grams (0.047 mols) 4-methyl-1-pentene, 100 millimols TiCl$_4$ and 200 millimols LiAl(heptyl)$_4$ at 25°C. was bubbled ethylene at atmospheric pressure. The product was separated from the gelatinous mixture by precipitation with methanol, methanol washing, and drying. This gave 2.03 grams of an interpolymer containing 28% of the 4-methyl-1-pentene component, by weight.

EXAMPLE 16

A catalyst mixture was prepared by mixing the following ingredients in the order indicated: 100 ml. toluene, 0.01 mol TiCl$_4$, 0.01 mol LiAl(CH$_2$CH$_2$-cyclohexenyl)$_4$. To this mixture was added octadecene-1 (35 ml.), and the resulting composition was introduced into a flask containing 200 ml. toluene in an ethylene atmosphere. The mixture was stirred while passing ethylene therein. Reaction was very fast and exothermic, temperature rising from 35°C. to 73°C. in 10 minutes. The reaction was continued for about 35 minutes. The polymer was isolated by adding methanol, washing with methanol and acetone, and drying. It was quite white and very tough. The weight of product was 17.8 grams; density was 0.920, and inherent viscosity was about 4 (4.1, 3.8). The experiment was repeated using various smaller quantities of octadecene-1, with the following results:

TABLE III

|  | A | B | C | D |
|---|---|---|---|---|
| Octadecene-1 | 2 ml. | 5 ml. | 8 ml. | 15 ml. |
| Time, min. | 30 | 13 | 22 | 55 |
| Temp., C° | 40–73 | 32–74 | 33–60 | 30–48 |
| Wt. Polymer, grams | 11.8 | 11.0 | 10.8 | 13.2 |
| Inherent Viscosity | 4.2,4.6 | 4.0,3.8 | 4.4,5.2 | 3.0,3.0 |
| Density | 0.938 | 0.935 | 0.935 | 0.938 |

The following table records results obtained in a series of tests showing that coordination catalysts can be used for interpolymerization of ethylene with a wide variety of alpha olefins.

TABLE IV
INTERPOLYMERIZATION OF ETHYLENE WITH VARIOUS ALPHA OLEFINS

| EXAMPLE NUMBER | COMONOMER | CATALYST | TEMP., C° | PRESSURE | YIELD, GRAMS | REMARKS |
|---|---|---|---|---|---|---|
| 17 | n-dodecene-1 | LiAlH$_4$ +TiCl$_4$ | 75 | autog. | 25.5 | melt index, 6.34 |
| 18 | 4-vinyl-1-cyclohexene | LiAlH$_4$ +TiCl$_4$ | 75 | autog. | 31.8 | melt index, 0.38 |
| 19 | styrene | LiAl(heptyl)$_4$ +TiCl$_4$ | minus 50 | atm. | 35.7 | 25% styrene in interpolymer |
| 20 | alpha methyl styrene | LiAl(heptyl)$_4$ +TiCl$_4$ | minus 50 | atm. | 63 | 29% alpha methyl styrene in interpolymer |

EXAMPLE 21

Into a reaction vessel the following streams were fed: (1) ethylene, (2) n-decene-1, dissolved in cyclohexane, and (3) a stream formed by joining a TiCl$_4$ + VOCl$_3$ + cyclohexane stream with an Al(isobutyl)$_3$ + cyclohexane stream. The TiCl$_4$:VOCl$_3$ mol ratio was 3:1, and the Al(isobutyl)$_3$:Ti+V mol ratio was 1.9:1. Concentration of Ti+V was 2.5 milligram mols per pound of cyclohexane, and concentration of Al(isobutyl)$_3$ was 2 milligram mols per pound of cyclohexane, in the respective streams. There was a nine seconds mixing time before these joined streams entered the reaction vessel. Concentration of the n-decene was 0.008 lbs. per lb. of cyclohexane. The respective rates of feed of these streams were such that the n-decene:ethylene ratio in the feed was 0.053 on a weight basis, the amount of catalyst being 0.14 milligrams (TiCl$_4$ + VOCl$_3$) per lb. of total charge. The rate of total input feed was 25 lbs. per hour and the reaction time was 5 minutes. Reaction temperature was 220°, and pressures 1500 psi. Into the effluent (220°C., 1500 psi) was injected isopropanol and acetyl acetone, in equimolal quantities, the number of mols of each being 7.5 per mol of Ti + V. The resulting mixture was held at this temperature and pressure for a residence time of 17 minutes, after which the mixture was passed over 14 to 20 mesh silica gel (200°C.). The liquid emerging from the absorbtion bed was sent to a low pressure separator, whereby all of the volatile material was removed. The resulting resin was sent through an extruder. It was an ethylene/n-decene-1 copolymer, containing 1.0% by weight of the n-decene-1 component, as determined by infra-red analysis. The melt index of this product was 0.9. In numerous experiments in which temperature and ratio of n-decene:ethylene in the feed were varied from the standard of reference provided by this example, it was found that by varying the polymerization temperature over the range from 150° to 250°, the melt index of the product could be varied as desired, from about 0.1 to about 10, the higher melt index being obtained at the higher temperature, and by varying the ratio of comonomer: ethylene in the feed from 0:1 to 2:1, the melt index could be raised from less than 0.1 to about 1 at 150°, and from less than 0.1 to above 10 at 250°. Novel interpolymers were obtained in which the density ranged from 0.95 to 0.94 and the n-decene-1 component was from 1 to 3% by weight of the interpolymer.

It is apparent from the foregoing examples that the present invention permits the production of interpolymers having a predetermined amount of branching and a predetermined melt index. It is to be understood, of course, that the variables used for control of these properties in Example 21 are not the only variables which can be used to control desirable properties.

An important property, which is subject to control is crystallinity. For copolymers having a relatively small amount of the non-ethylene component (e.g. 1 to 5%) the variations in density generally reflect differences in percent crystallinity, as determined by X-ray methods. For such copolymers a density of 0.91 corresponds with about 50% crystallinity; 0.92, ca. 55%; 0.93, ca. 60%; 0.94, ca. 65%; 0.95, ca. 70%. In actual practice, the % crystallinity can be controlled most readily by controlling the percentage of comonomer; thus in making copolymers by the methods hereinabove illustrated a density of 0.95 corresponds with about 1% of the comonomer (regardless of whether the comonomer is pentene-1, n-decene-1, etc.); 0.94, about 2 to 3%; 0.93, about 5% (±2); 0.92, about 9% (±3); 0.91 about 14% (±5); 0.9 about 20% (±5). The percentage crystallinity of interpolymers containing 1–20% copolymerized higher olefin was such that the density of these interpolymers ranged from 0.95 at 1% to 0.90 at 20% by weight copolymerized higher olefin, the X-ray crystallinity thus falling from 70% at 1% comonomer to 40% at about 20% comonomer. It is to be understood, of course, that these figures are approximate only, since variations can occur in % crystallinity at a fixed level of comonomer content. This can occur by the use of such expedients as fractionation, special solvents during the polymerization, and the like. The figures given do, however, serve as a practical guide, especially when the polymerization method is of the general type illustrated in Example 21.

Many important properties are dependent upon percent crystallinity. For example, in the copolymers just described a density of 0.94 to 0.95 corresponds with a stiffness of about 60,000 to 100,000 psi.

Although the examples illustrate copolymers having only two components, it is to be understood that equally good results are achieved by employing more than one of the comonomers hereinabove disclosed, in combination with ethylene.

While certain of the foregoing examples illustrate the use of Ti + V catalyst, it is to be understood that excellent products are similarly obtained by the use of Ti halide without the V halide. An advantage in the use of the combined transition elements is the improved rate, compared with the rate obtained with single transition element compounds. An advantage in using the solution process, rather than the low temperature process, is the narrower distribution of molecular weight of products obtained in the solution process. In general, best products are those made with catalysts containing at least some Ti-halogen bonding.

A test commonly used by commercial wire coating fabricators to rate the stress crack resistance of polyethylene is the Western Electric Company test which is performed as follows: A coated wire is wrapped ten turns around a mandrel having the same diameter as the over-all diameter of the coated wire. This twisted sample is then placed in a 100°C. air oven and the time required for the coating to crack is recorded. At 100 hr. intervals, if no failure has occurred, the wires are removed from the oven, ten additional turns are applied and the samples replaced in the oven. The data in Table V show that (at close to the optimum content of comonomer) only copolymers of ethylene with alpha olefins having 5 or more carbon atoms have sufficient stress crack resistance to qualify for those wire coating applications in which both stress crack resistance and high crystallinity as indicated by the density values in the table are required.

the conventional branched polyethylenes due to the relatively low crystallinity level failed relatively rapidly when tested in hot water and under normal service pressures. Furthermore, at hot water temperatures, pipes from these resins would require special supporting devices to compensate for the large amount of creep which would occur. The linear polyethylenes are sufficiently high in crystallinity to have at hot water temperatures a relatively low creep rate. Unfortunately, the linear polyethylene compositions heretofore known proved to be unsatisfactory for hot water service; the pipes failed surprisingly rapidly, i.e. in only a matter of days, when tested at stresses at which the pipe is expected to stand up virtually indefinitely. In accordance with the present invention an ethylene-decene copolymer of 0.937 density is obtained which can withstand the pressures required for hot water pipe applications. Furthermore, these resins are sufficiently high in crystallinity so that the pipes do not distort appreciably at elevated temperatures due to a creep phenomenon. The branches in the ethylene-butene copolymer are not of the proper length for a hot water pipe resin; the latter copolymers show no advantage over the conventional branched polyethylene resin in performance.

There are potentially many new fields of application for moldings (injection moldings; blow molding and vacuum forming) which are available to the high density polyethylenes but not available to the conventional branched polyethylenes of commerce because of stiffness considerations. However, in many of these molding applications, the resins are required to withstand moderate stresses at elevated temperatures, e.g., gears, bushings, etc. A test commonly used to rate the stress

TABLE V

STRESS CRACK RESISTANCE OF HIGH DENSITY HYDROCARBON POLYMERS AS MEASURED ON WIRE COATINGS BY THE WESTERN ELECTRIC 100°C. AIR OVEN WIRE TWIST TEST

| COPOLYMER | MELT INDEX | DENSITY | COATING WALL THICKNESS | HOURS * TO FAILURE AT 100°C. |
|---|---|---|---|---|
| Linear PE | 0.24 | 0.945 | 30 mils | 11 |
| Linear PE | 0.6 | 0.952 | 30 mils | 104 |
| Linear PE | 0.6 | 0.960 | 30 mils | 10 |
| Linear PE | 1.0 | 0.953 | 30 mils | 101 |
| Linear PE | 1.9 | 0.953 | 30 mils | 45 |
| Linear PE | 3.2 | 0.953 | 30 mils | 8 |
| Ethylene-butene-1 | 0.4 | 0.940 | 25 mils | 106 |
| Ethylene-pentene-1 | 0.24 | 0.938 | 25 mils | 640 |
| Ethylene-decene-1 | 0.6 | 0.945 | 30 mils | above 1000 ** |
| Ethylene-decene-1 | 0.77 | 0.940 | 25 mils | above 1000 ** |
| Ethylene-decene-1 | 2.1 | 0.939 | 25 mils | 860 |

* At the end of each 100 hour interval the samples were removed from the oven, 10 additional turns put into the sample, the sample placed back into the oven, and the accumulative hours to failure recorded. For example, the sample which failed in 860 hours failed 60 hours after it had been twisted for the ninth time.
** Did not fail.

The Insulated Power and Cable Engineers Association has for many years specified that polyethylene wire coating resins must retain 75% of their original elongation after 48 hours heating at 100°C. Prior art teaches that the branched polyethylenes of commerce, heretofore known, cannot meet this specification if the crystallinity is above the level corresponding to a density of 0.925. However, the alpha olefin-ethylene copolymers of the present invention having 5 or more carbon atoms per molecule in the alpha olefin comonomer, pass this specification test even at crystallinities corresponding to densities as high as 0.945.

Heretofore, there were no polyethylene resins suitable for hot water pipe applications. Pipe made from crack resistance of polyethylenes is to bend through 180° a 1½ × ½ × ⅛ inches compression molded bar with or without a purposely notched imperfection in the surface, to heat this specimen in the presence of an active environment, and then to measure the time to failure. We chose to test the stressed specimens in 100°C. air as well as the commonly used Igepal Co-630. Failures of the unnotched samples in air are indicative of the resins not being suitable for use in molding applications in which the articles are subjected to both stress and heat. The data in Table VI show that only the alpha olefin-ethylene copolymers produced with alpha olefins containing 5 or more carbon atoms have the stress crack resistance and stiffness required for the above mentioned molding applications. Again the conventional branched polyethylenes of commerce and the shorter and longer branched copolymers do not have sufficient stress crack resistance. In the case of the weight). With linear polyethylenes neither route produces stress crack resistance comparable to the $C_5$ to $C_{18}$ chain length alpha olefin-ethylene copolymers. This is shown in Tables VII and VIII.

TABLE VI

ENVIRONMENTAL STRESS CRACK TEST DATA
ON ETHYLENE POLYMERS AND INTERPOLYMERS (COMONOMER CONTENT, ca. 2%)

| RESIN TYPE | MELT INDEX | DENSITY | STIFFNESS | HOURS TO 50% FAILURE 50°C. Igepal[1] | 100°C. Air[2] |
|---|---|---|---|---|---|
| Free Radical) | 2.1 | 0.930 | 39,000 | 0.3 | above 1000 |
| (ca. 1000 atm.)) | 1.3 | 0.954 | 86,000 | 1 | below 10 |
| Linear Polyethylenes | 0.2 | 0.945 | 80,000 | 30 | 11 |
| | 0.4 | 0.954 | 94,000 | 20 | 21 |
| | 1.9 | 0.955 | 94,000 | 7 | 12 |
| | 2.8 | 0.952 | 98,000 | 4 | 12 |
| | 6.1 | 0.949 | 84,000 | 1.3 | 1 |
| Ethylene-butene-1 | 0.4 | 0.944 | 74,000 | 120 | 720 |
| | 1.6 | 0.944 | 78,000 | 9.5 | 480 |
| | 0.2 | 0.955 | 93,000 | 27 | 48 |
| Ethylene-decene-1 | 0.7 | 0.941 | 68,000 | 984 | above 1000 |
| | 1.1 | 0.940 | 64,000 | 509 | 1000 |
| | 0.6 | 0.944 | 66,000 | 360 | 1000 |
| | 0.8 | 0.943 | 75,000 | 196 | 1000 |
| | 2.1 | 0.943 | 81,000 | 110 | 1000 |
| | 0.3 | 0.947 | 88,000 | 73 | 1000 |
| | 0.3 | 0.948 | 97,000 | 80 | 1000 |
| Ethylene-tetradecene-1 | 1.6 | 0.939 | 71,000 | above 200 | 1000 |
| Ethylene octadecene-1 | 3.8 | 0.941 | 60,000 | 30 | 1000 |
| | 0.6 | 0.942 | 61,000 | above 200 | 1000 |

[1] Notched imperfection in test.
[2] Unnotched test specimen.

TABLE VII

THE EFFECT OF THE BRANCH TYPES RESULTING FROM MILDLY CROSSLINKING LINEAR POLYETHYLENE
(BY VAN DE GRAAFF IRRADIATION) ON STRESS CRACK RESISTANCE

| EXPERIMENT | POLYMER | MELT INDEX | DENSITY | STIFFNESS | TIME TO 50% FAILURE: HOURS IN 50°C. IGEPAL SAMPLE NOTCHED |
|---|---|---|---|---|---|
| | Controls - | | | | |
| (a) | Linear polyethylene | 0.5 | 0.955 | 100,000 | 30 |
| (b) | Ethylene decene copolymer | 0.6 | 0.944 | 66,000 | above 1000 |
| (c) | Irradiated linear polyethylene* | 3.5 | 0.949 | 95,000 | 1.5 |
| (d) | Irradiated linear polyethylene* | 1.2 | 0.949 | 98,000 | 2.0 |
| (e) | Irradiated linear polyethylene* | 0.8 | 0.948 | 98,000 | 2.0 |
| (f) | Irradiated linear polyethylene* | 0.3 | 0.947 | 94,000 | 2.0 |
| (g) | Irradiated linear polyethylene* | 0.04 | 0.947 | 90,000 | 2.5 |
| (h) | Irradiated linear polyethylene* | 0.00 | 0.941 | 67,000 | 3.5 |

*Melt index of linear polyethylene prior to irradiation was 6.0.

TABLE VIII

THE EFFECT OF NUMBER AVERAGE MOLECULAR WEIGHT (Mn) AND
MOLECULAR WEIGHT DISTRIBUTION ($M_w/M_n$) ON STRESS CRACK RESISTANCE

| EXPERIMENT | POLYMER | MELT INDEX | $M_w$[1] | $M_n$[2] | $M_w/M_n$[3] | TIME TO 50% FAILURE IN 50°C IGEPAL SAMPLE NOTCHED | IN 100°C. AIR SAMPLE UNNOTCHED |
|---|---|---|---|---|---|---|---|
| (i) | Linear Polyethylene | 1.9 | 100,000 | 15,000 | 7 | 7 | 12 |
| (j) | Linear Polyethylene Narrow Fractions From Linear Polyethylene | 3.7 | 83,000 | 68,000 | 1.2 | 3 | 0.5 |
| (k) | (A) | 2 | 90,000 | 45,000 | 2 | 3 | — |
| (l) | (B) | 0.1 | 200,000 | 100,000 | 2 | 16 | 5 |
| (m) | (C) | 0.01 | 40,000 | 200,000 | 2 | 2 | 1 |

[1] By inherent viscosity vs $M_w$ correlations.
[2] By end group analysis from Infra red scans.
[3] Calculated from $M_w$ and $M_n$.

heretofore known conventional branched polyethylenes of commerce, the prior art teaches that stress crack resistance is improved by either mildly crosslinking the polymers by electron bombardment or by synthesizing a polymer with a narrow molecular weight distribution (and a high number average molecular By mildly crosslinking polyethylene we are in fact putting long chain branches onto polyethlene. Although the density is significantly reduced in this process, stress crack resistance is not improved, verifying that long branches on polyethylene are not effective in achieving stress crack resistance.

The data presented in the foregoing tables demonstrate the extraordinary advantages of the products of this invention and the fact that these advantages cannot be realized by methods of the prior art.

It is to be understood that in all of the foregoing practical applications, a judicious choice of melt index and other controllable properties should be made. For the manufacture of heavy duty pipe, a relatively lower density, e.g. 0.935, for optimum toughness under elevated temperatures (hot water), would be desirable in many instances. For films, excellent toughness and low crystallinity (density 0.930 to 0.935, for example), are preferred. All of these variations are readily controllable in accordance with the method of this invention.

What is claimed is the following.

1. An interpolymer composed of interpolymerized comonomers consisting essentially of ethylene and at least one normal aliphatic mono-alpha-olefinic hydrocarbon containing from 5 to 10 carbon atoms per molecule, the proportion of said monoolefinic hydrocarbon being from 3 to 7% of the weight of the interpolymer, said interpolymer having a melt index within the range of 0.3 to 20, and, when in the form of a film, an Elmendorf tear strength in the range of 150 to 400 grams per mil, and a density of 0.93 to 0.94.

2. An interpolymer of ethylene and from 1% to 20% by weight of a higher olefinic hydrocarbon having 5 to 18 carbon atoms per molecule, said higher olefinic hydrocarbon having no non-aromatic unsaturation other than one terminal —CH=CH$_2$ per molecule, said interpolymer having essentially no other copolymerized components, the proportion of the interpolymerized ethylene component therein being not less than 80% nor more than 90% by weight, the percentage crystallinity of the interpolymer being such that the density ranges from 0.95 at 1% interpolymerized higher olefinic hydrocarbon down to 0.9 at 20% interpolymerized higher olefinic hydrocarbon.

3. Composition of claim 2, wherein said higher olefinic hydrocarbon is n-dodecene-1.

4. An ethylene/n-decene-1 interpolymer having a density of 0.94 to 0.95, the n-decene-1 component thereof being from 1 to 3% by weight of said interpolymer.

5. An interpolymer of ethylene and a higher olefinic hydrocarbon having 5 to 10 carbon atoms per molecule, said higher olefinic hydrocarbon having one terminal —CH=CH$_2$ per molecule and no other olefinic unsaturation, said interpolymer being further characterized in that it has an X-ray crystallinity in the range of 40 to 70%, a melt index in the range of 0.3 to 20, a density in the range of 0.9 to 0.95 and said interpolymer being further characterized in that its density is not less than 0.93 unless the content of said higher olefinic hydrocarbon in the interpolymer is at least 3% by weight.

6. Composition of claim 5, wherein said higher olefinic hydrocarbon is n-heptene-1.

7. Composition of claim 5, wherein said higher olefinic hydrocarbon is n-pentene-1.

8. Composition of claim 5, wherein said higher olefinic hydrocarbon is n-decene-1.

9. Composition of claim 5, wherein said higher olefinic hydrocarbon is n-octene-1.

10. Composition of claim 5 in the form of a film.

11. Composition of claim 5 which is further characterized by having in film form an Elmendorf tear strength in the range of 150–400 grams/mil and a density of 0.910 to 0.935.

12. Composition of claim 5 in the form of pipe which is further characterized by withstanding 3000 hours at hoop stress of 750 psi and a temperature of 60°C.

13. Composition of claim 5 in the form of a fabricated molding having a stress crack resistance of greater than 1000 hours using an unnotched test specimen.

14. A composition of claim 5 having a density in the range of 0.910 to 0.945 and a melt index in the range of 0.3 to 2.1.

15. As an article of commerce, wire coated with a composition of claim 14, characterized in that the wire-coating withstands more than 1000 hours in air without failure in the Western Electric wire twist test.

* * * * *

UNITED STATES PATENT OFFICE
CERTIFICATE OF CORRECTION

PATENT NO. : 4,076,698
DATED : February 28, 1978
INVENTOR(S) : Arthur William Anderson, Gelu Stoeff Stamatoff It is certified that error appears in the above-identified patent and that said Letters Patent are hereby corrected as shown below:

Column 13, line 34 should read --

80% nor more than 99% by weight, the percentage

Signed and Sealed this

Twenty-sixth Day of September 1978

[SEAL]

Attest:

RUTH C. MASON
Attesting Officer

DONALD W. BANNER
Commissioner of Patents and Trademarks

REEXAMINATION CERTIFICATE (1985th)

United States Patent [19]

Anderson et al.

[11] B1 4,076,698

[45] Certificate Issued Apr. 27, 1993

[54] HYDROCARBON INTERPOLYMER COMPOSITIONS

[75] Inventors: Arthur W. Anderson, Wilmington; Gelu S. Stamatoff, Newark, both of Del.

[73] Assignee: E. I. Du Pont de Nemours and Company, Wilmington, Del.

Reexamination Request:
No. 90/001,604, Sep. 21, 1988

Reexamination Certificate for:
Patent No.: 4,076,698
Issued: Feb. 28, 1978
Appl. No.: 632,416
Filed: Jan. 4, 1957

Certificate of Correction issued Sep. 26, 1978.

Related U.S. Application Data

[63] Continuation-in-part of Ser. No. 568,707, Mar. 1, 1956, abandoned.

[51] Int. Cl.$^5$ .................. C08F 210/14; C08F 210/16
[52] U.S. Cl. .......................... 526/348.6; 526/348.2; 526/348.3; 526/348.5; 526/348.4
[58] Field of Search ............... 526/348.2, 348.3, 348.4, 526/348.5, 348.6

[56] References Cited

U.S. PATENT DOCUMENTS

| | | | |
|---|---|---|---|
| 2,728,752 | 12/1955 | Brown | 260/88.1 |
| 2,822,357 | 2/1958 | Brebner | 260/94.9 |
| 2,825,721 | 3/1958 | Hogan et al. | 260/88.1 |
| 2,839,518 | 6/1958 | Brebner | 260/94.9 |
| 2,846,425 | 8/1958 | Hogan et al. | 260/93.7 |
| 2,862,917 | 12/1958 | Anderson et al. | 260/94.9 |
| 2,899,413 | 8/1959 | Hagemeyer, Jr. et al. | 260/88.1 |
| 2,905,645 | 9/1959 | Anderson et al. | 252/429 |
| 3,051,690 | 8/1962 | Vandenberg | 260/88.2 |
| 3,058,963 | 10/1962 | Vandenberg | 260/88.2 |
| 3,219,649 | 11/1965 | Nowlin et al. | 260/93.7 |
| 3,257,367 | 6/1966 | Haven | 260/93.7 |
| 3,582,987 | 6/1971 | Natta | 260/93.5 |

OTHER PUBLICATIONS

Buckley et al., "The Decomposition of Aliphatic Diazo-compounds by Trimethyl Borate: The Preparation of Branched-chain Paraffins of High Molecular Weight," Journal of the Chemical Society, pp. 3701–3704 (1952).

Richards, "Polyethylene Structure, Crystallinity and Properties," Journal of Applied Chemistry, pp. 370–376 (Aug., 1951).

The decision of the Federal Circuit in *E. I. du Pont de Nemours & Co. v. Phillips Petroleum Co.*, 7 USPQ 2d 1129 (Fed. Cir. 1988).

The judicial admission of DuPont in *E. I. du Pont de Nemours & Co. v. Phillips Petroleum Co.*, Defendant's Trial Exhibit 859.

*Primary Examiner*—Edward J. Smith

[57] ABSTRACT

Interpolymers composed of ethylene and higher olefinic hydrocarbons having 5 to 18 carbon atoms per molecule. Said interpolymers being useful as molding, pipes and wire coatings.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 7, lines 12-15:

The following table records results obtained in a series of tests showing that coordination catalysts can be used for interpolymerization of ethylene with a wide variety of [alpha olefins] *unsaturated hydrocarbons*.

Column 7, Table IV, Title:

INTERPOLYMERIZATION OF ETHYLENE WITH VARIOUS [ALPHA OLEFINS] *UNSATURATED HYDROCARBONS*

AS A RESULT OF REEXAMINATION, IT HAS BEEN DETERMINED THAT:

Claims 1-15 are cancelled.

* * * * *